J. I. & W. J. METTLER.
Tile-Laying Machine.

No. 200,557. Patented Feb. 19, 1878.

Witnesses.
A. Ruppert,
J. G. Mason.

Inventor.
W. J. & J. I. Mettler
D. P. Holloway & Co
Attys

UNITED STATES PATENT OFFICE.

JAMES I. METTLER AND WILLIAM J. METTLER, OF MENDOTA, ILLINOIS.

IMPROVEMENT IN TILE-LAYING MACHINES.

Specification forming part of Letters Patent No. 200,557, dated February 19, 1878; application filed December 29, 1877.

*To all whom it may concern:*

Be it known that we, JAMES I. METTLER and WILLIAM J. METTLER, of Mendota, in the county of La Salle, State of Illinois, have invented a new and useful Improvement in Tile-Laying Machines, of which the following is a specification:

On the 10th day of July, 1877, we took out Letters Patent on improvements in tile-laying machines, No. 193,019, on applying which we find that in working in ground covered with a thick, tough sod the side cutters, which extend above the surface of the ground, will not cut it, but tear it up, thus making the machine very hard to move forward. To avoid this difficulty we have adopted the device that is the subject of this application.

Figure 1:
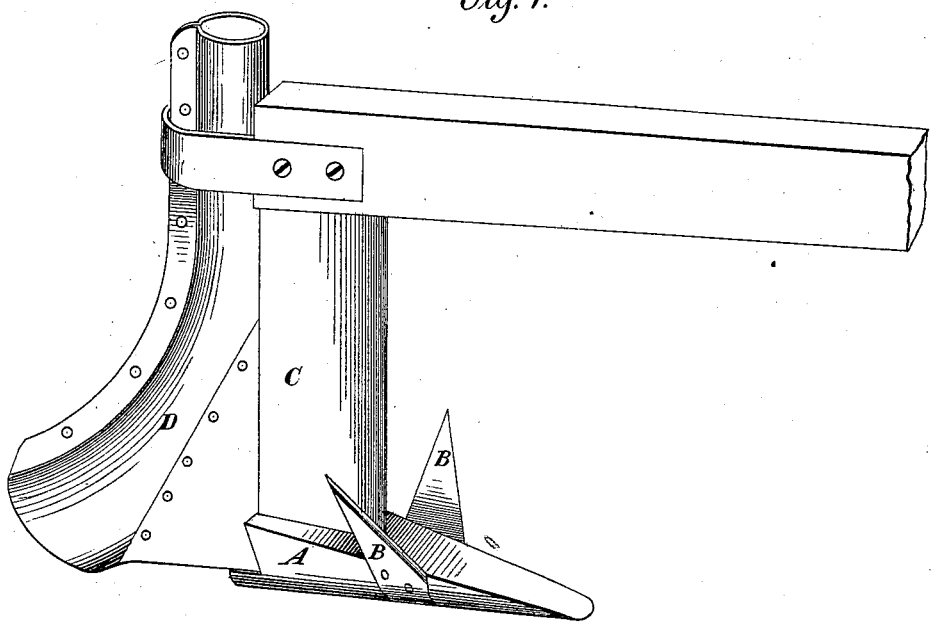
Figure 2:
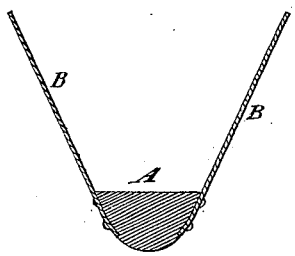

In the annexed drawing, making a part of this specification, Figure 1 is a perspective view, and Fig. 2 is a vertical section, of the side cutters and mole.

The same letters are employed in both figures in the indication of identical parts.

The side cutters, as described in our said original Letters Patent, consist of metal blades extending from each side of the mole A, and secured to it, to arms projecting from the lever on the upper side of the beam. (Not shown in this drawing.) In this application the side cutters B are also securely bolted to the sides of the mole A; but they do not extend to the surface of the ground. They consist of metal, shaped and inclined to the face of the mole, as clearly shown in Figs. 1 and 2. By shaping the blades or cutters as shown, an easy passage through the ground is secured, as there will be less pressure against them, and they will be less liable to be bent out of their original position than if they were simply narrow blades. The form is that of a right-angle triangle, the hypotenuse being the cutting-edge, and the base being secured to the mole.

What we claim as our invention, and desire to secure by Letters Patent, is—

The combination, in a tile-laying machine, of the mole A and lateral inclined cutters B, extending upward from the mole, but not to such a distance as to cut the sod, substantially as set forth.

In testimony whereof we have signed our names to this specification in the presence of two subscribing witnesses.

JAMES I. METTLER.
    WILLIAM J. METTLER.

Witnesses for James I. Mettler:
  DAVID Y. LOWD,
  C. A. CROCKER.

Witnesses for William J. Mettler:
  B. KNAPP,
  C. J. KNAPP.